United States Patent Office 3,537,321
Patented Nov. 3, 1970

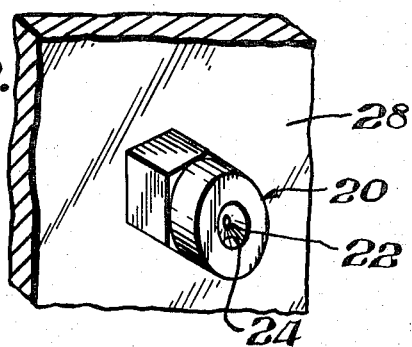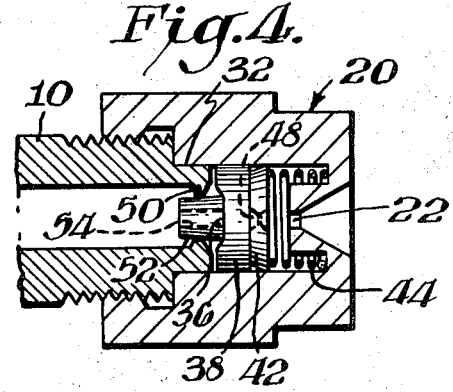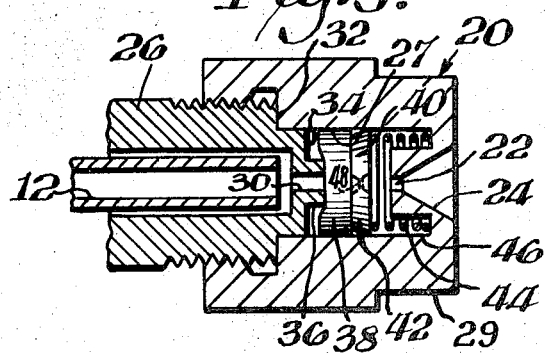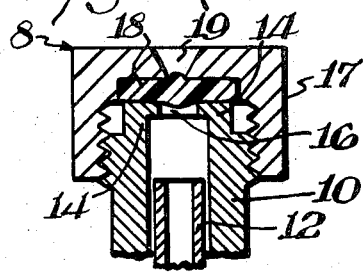

3,537,321
SEPTUM ASSEMBLY
Lawrence J. LaBarre, Mountain View, Calif., assignor to Hewlett-Packard Company, Palo Alto, Calif., a corporation of California
Filed Aug. 7, 1968, Ser. No. 750,895
Int. Cl. G01n *31/08*
U.S. Cl. 73—422                     4 Claims

ABSTRACT OF THE DISCLOSURE

A hollow cylindrical end cap engages the tubular injection block of a gas chromatograph. The end cap has a tapered orifice in its end face and encloses a septum which seals the entrance to the injection block, and a rigid support disc for the septum. The disc has an orifice aligned with the end face orifice and the entrance to the injection block. A compression spring, also contained in the end cap, maintains a constant sealing force against the septum. The inlet to the injection block has a raised annular boss which engages the septum to decrease the pressure required to maintain the seal.

BACKGROUND OF THE INVENTION

This invention relates to a septum assembly and, more particularly, to a septum assembly having improved sealing characteristics, the capability of repeated use, and features which enhance piercing.

In the field of gas chromatography a small liquid sample is introduced into the so-called injection block of a gas chromatograph, usually by means of a syringe. The injection block is located at the upstream end of the chromatograph separating column and is heated to flash vaporize the injected sample. A carrier gas swept across the backside of the septum and through the column to transport the vaporized sample through the column for separation and subsequent detection. The syringe needle is inserted through a self-sealing material, usually referred to as a septum, which seals the interior of the injection block from the atmosphere.

Regardless of the material of which the septum is made, leaks develop after it has been penetrated a number of times by the syringe needle. Also, if the proper sealing pressure is not employed, the septum may leak even prior to use. On the other extreme, if the septum cap nut is tightened too much, the septum itself can become distorted and cut, or the rubber of the septum trying to relieve itself from the compression does so by bulging into the small opening which the needle is intended to pass through. This excess blob of septum rubber at this opening location protrudes sufficiently to form a stressed "ball" of septum rubber. Now the needle to enter must not only pierce a greater thickness of rubber but do so when the rubber is highly stressed in this ball-like shape. The effect is that the syringe needle tends to bend more easily and to a greater degree. The bore of the needle sometimes even removes or cuts out a small rubber plug. This injures the septum and plugs the syringe needle. All of these problems have reduced the usefulness and desirability of septums of the past.

It is, therefore, an object of this invention to provide an improved septum assembly.

Another object of this invention is to provide an improved septum which has a longer leak-free life than those of the prior art.

BRIEF DESCRIPTION OF THE INVENTION

The septum assembly of this invention is adapted to fit on the entrance to the injection block of a gas chromatograph. The injection block is a tubular member defining a cavity having an inlet opening and an outlet opening connected to the separating column. A self-sealing disc is disposed over the inlet opening of the tubular member and is backed up by a supporting member having a central orifice aligned with the inlet opening of the tubular member. A compression spring maintains a predetermined force against the supporting member and hence the septum. In turn, the compression spring is held in position by a cap nut which engages the injection block and has a tapered inlet orifice aligned with both the inlet opening of the tubular member and the orifice of the supporting disc.

By selecting both orifices to have a diameter less than that of the column, the diameter of the inlet opening to the tubular member may be reduced in diameter. This permits a lower durometer septum material to be employed, which has improved sealing qualities. Also since there is less area exposed, the gasout problem through the pores of the septum material is reduced. The inlet opening is provided with a raised annular boss which engages the septum over a relatively small area to provide a seal with reduced sealing force. The sealing force is repeatable and controllable because of the use of a spring.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a cross-sectional view of a conventional sample injection port of the type employed by the prior art;

FIG. 2 is an isometric view of the septum assembly of this invention mounted on the face plate of a gas chromatograph;

FIG. 3 is a cross-sectional view of the septum assembly of this invention showing the manner in which the septum is associated with the injection block of a gas chromatograph; and FIG. 4 is also a cross-sectional view of a septum assembly constructed using an alternative embodiment of this invention.

DESCRIPTION OF THE PREFERRED EMBODIMENT

Before considering the specifics of the preferred embodiment of this invention it is believed that a brief consideration of the prior art will aid in an understanding of the advantages of the invention. A typical sample injection port of the prior art is illustrated in FIG. 1. In this figure there is shown an injection port 8 which includes an injection block in the form of a tubular section 10 having a partially closed outer end section 14 of reduced diameter to provide an inlet orifice 16. A chromatographic separating column 12 is coaxially positioned within the tubular section 10 by conventional techniques. An injection port of this type is described for example in U.S. Pat. 3,327,520 issued June 27, 1967 to A. C. Stapp, Jr.

The inlet orifice 16 is coaxially aligned with the separating column 12. Also, the outer periphery of the end portion of the tubular section 10 is threaded to receive a retaining cap nut 17 which retains a self-sealing cap or septum 18. The septum 18 is of conventional type and typically is formed of silicon rubber or any other suitable material capable of accommodating a hypodermic needle or a capillary sized tubing as is employed in syringes. The septum 18 seats against the end face of the tubular section 10 and seals the interior of the tubular section 10 because of the compression of the threaded retainer cap 17. An opening 19 in the retainer cap 17 is in alignment with the inlet opening 16 in the tubular section 10 to permit the insertion of a syringe needle through the septum 18 for injection of a fluid sample into the column. The opening 19 in the retainer cap is flared to facilitate the insertion of the needle.

Septums of this type, which is typical of those used in the prior art, have many inherent problems. For one, the compression of the septum 18 is a function of the torque applied to the retaining cap 17. It is very difficult to obtain repeatedly a desired compression on the septum. If the compression is too low the septum is often subject to leakage. On the other hand, if the septum nut is tightened too tight, it could squeeze the septum rubber into the opening which is the point at which the needle must pass. This makes the injection more difficult and increases the probability of plugging the needle with rubber of the septum as described hereinbefore. In the extreme, the septum may even become cut. Furthermore, due to the relatively large orifice 16, the septum must cover a relatively large surface area. Since a large surface area of the septum is exposed to the low gas pressure of the injection block, an unacceptable amount of "gasout" occurs. The term "gasout" is used to refer to the leakage of the gas through and from the pores in the septum material itself.

In accordance with this invention, the sample injection port is formed from a piece of metal hex bar stock 20 (FIG. 2) into a tubular retaining cap 20 which engages the threaded outer end of a tubular injection block 26. The retaining cap 20 has a central orifice 22 which is tapered or flared as at 24 to facilitate the alignment of a syringe needle with the orifice 22. The retaining cap 20 appears at the front of the instrument panel 28 of a gas chromatograph in use. The details of the construction of the sample injection port of this invention are perhaps most clearly seen in the cross-sectional view of FIG. 3.

In FIG. 3, as in FIG. 2, it is seen that the front portion 29 of the retaining cap is rounded. The tubular section 26 of the injection block accommodates a separating column 12 coaxially disposed therein. The front or inlet end of the tubular section 26 has a centrally aligned orifice 30 of reduced diameter, i.e., preferably less than the internal diameter of the separating column. The outer end portion of the injection block tubular section 26 is of reduced diameter or form a step 32 which limits how far the retaining cap 20 may be screwed onto the end of the tubular section 26. A second step 34 is formed in the outer end portion of the tubular section 26 about the central orifice 30 to form a raised annular rim or boss 36 which engages a septum 38. The septum 38 is in the form of a disc having roughly the internal diameter of the bore 27 of the retaining cap 20. The septum 38 is supported by a pressure plate 40 which also is cylindrical and disc-like in shape. The outer periphery of the pressure plate 40 is bevelled to one face, as at 42, to prevent its binding within the bore 27 of the retaining cap 20. The septum 38 is pressed against the raised ridge or rim 36 by the action of the pressure plate 42 under the influence of a compression spring 44.

The compression spring 44 fits into an annular recess 46 which is a continuation of the bore 27 within the retaining cap 20. The pressure plate 40 has a central orifice 48 machined to have a cone shaped entrance from either face so that the pressure plate 40 may be inserted, without regard to direction, within the bore 27. In this manner, the tapered entrances facilitate the entry of a syringe needle to a repeated and desired location. The central orifice 48 is aligned with the inlet orifice 30 of the tubular section 26 of the injection block and also with the inlet orifice 22 of the retaining cap 20. It will be noted that the diameters of each of the orifices 30, 48, and 22 are small, preferably less than the internal diameter of the column 12 such that the needle alignment once established by the first two orifices 22 and 48 is carried on through the inlet orifice 30 of the injection block and into the column. Due to the small diameters, there is less chance for the needle to be moved about in a manner such as to damage the septum material as exists in conventional injection ports.

Furthermore, because of the raised rim 36, the spring force required to establish a seal about the inlet orifice 30 by the septum is relatively small since the contact area is small. Since the diameter of the inlet orifice 30 is small a relatively low durometer material may be used for the septum. With less surface area the septum need not be as rigid. This enhances the ability of the septum to resist gasout. Finally, the use of the spring 44 to establish the septum sealing pressure means that a substantially constant, repeatable septum sealing pressure is always applied. To adjust the septum pressure, one merely need use a weaker or stronger spring.

In the embodiment of FIG. 4, all of the parts are substantially the same as those seen in the embodiment of FIG. 3 and accordingly bear the same reference numerals. The significant change is that the embodiment of FIG. 4 represents a means by which existing injection blocks may be modified or adapted to utilize this invention. To perform the modification, the conventional tubular section 10 of a prior art injection block as represented in FIG. 1 need only be drilled out and enlarged at its end section 50 to permit the insertion of a tapered tubular section 52. The tubular section 52 may be press fitted into the enlarged orifice 50. This tapered tubular section 52 provides the annular rim or boss 36 which contacts the septum 38 with the resulting advantages described above. Since the remaining parts are the same and with the notation that the tapered tubular insert 52 has a central orifice 54 which is aligned with the cap nut orifice 22 and pressure plate orifice 48, as described in conjunction with FIG. 3, it is believed that no further description need be made.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A sample injection port for use with chromatographic apparatus having a separating column adapted to separate a sample mixture transported through the column by a moving phase comprising:

a tubular member defining a cavity having an inlet opening and an outlet opening adapted to receive the inlet end of said separating column;

a wedge-shaped tubular insert adapted to fit said inlet opening to provide a raised annular boss;

self-sealing means disposed over said raised annular boss and adapted to be pierced by a needle for introducing a sample into said column;

a supporting disc-like member for said self-sealing means having a central orifice aligned with said inlet opening and positioned adjacent said self-sealing means; and compression means for compressing said self-sealing means between said disc-like member and said raised annular boss provided by said tubular insert.

2. An apparatus according to claim 1 wherein said compression means includes a compression spring for maintaining a constant compressive force against said disc-like member.

3. A sample injection port for use with chromatographic apparatus having a separating column adapted to separate a sample mixture transported through the column by a moving phase comprising:

a tubular member defining a cavity having an inlet opening and an outlet opening adapted to receive the inlet end of said separating column;

a retaining cap secured to said tubular member, said retaining cap having an end portion defining an outwardly opening tapered orifice for guiding a needle toward said inlet opening to introduce a sample into said column;

self-sealing means disposed over said inlet opening and internally of said retaining cap, said self-sealing means adapted to be pierced by said needle;

a disc-like mmeber disposed internally of said retaining cap for supporting said self-sealing means, said disc-like member having an orifice aligned with said inlet opening and positioned adjacent said self-sealing means; and compression spring means disposed internally of said retaining cap for compressing said self-sealing means between said disc-like member and the inlet opening of said tubular member, said compression spring means being operative to maintain a constant compressive force against said disc-like member.

4. An instrument according to claim 3 wherein the inlet opening of the said tubular member has a raised annular boss adapted to engage said sealing means thereby to reduce the compressive force required to seal said cavity and to improve said seal.

References Cited
UNITED STATES PATENTS

| | | | |
|---|---|---|---|
| 3,000,218 | 9/1961 | Marks et al. | 73—23.1 XR |
| 3,247,704 | 4/1966 | Konig | 73—23.1 |
| 3,327,520 | 6/1967 | Stapp | 73—23.1 |
| 3,374,660 | 3/1968 | McKinney et al. | |

LOUIS R. PRINCE, Primary Examiner

H. C. POST III, Assistant Examiner